United States Patent [19]
Geile et al.

[11] Patent Number: 5,062,123
[45] Date of Patent: Oct. 29, 1991

[54] KALMAN PREDICTOR FOR PROVIDING A RELATIVELY NOISE FREE INDICATION OF THE PHASE OF A CARRIER LADEN WITH NOISE

[75] Inventors: Michael J. Geile, Loveland; Terrance J. Hill, Fairfield, both of Ohio; Patrick J. Kavanaugh, Seattle, Wash.

[73] Assignee: Cincinnati Electronics Corporation, Cincinnati, Ohio

[21] Appl. No.: 394,330

[22] Filed: Aug. 16, 1989

[51] Int. Cl.$^5$ ............................................. H04L 27/22
[52] U.S. Cl. ..................................... 375/81; 329/307; 375/97
[58] Field of Search ............................ 331/1 A, 17, 25; 329/307, 310, 358, 308; 328/133, 155, 165, 167; 375/15, 81, 96, 97; 364/724.01, 724.18, 724.19

[56] References Cited

U.S. PATENT DOCUMENTS

| | | | |
|---|---|---|---|
| 3,909,735 | 9/1975 | Anderson et al. | 329/325 |
| 3,984,634 | 10/1976 | Painter | 375/96 |
| 4,005,266 | 1/1977 | Lehr et al. | 375/96 |
| 4,038,536 | 7/1977 | Feintuch | 328/167 |
| 4,131,862 | 12/1978 | Black et al. | 331/4 |
| 4,462,108 | 7/1984 | Miller | 375/97 |
| 4,479,091 | 10/1984 | Yoshisato | 329/326 |
| 4,484,152 | 11/1984 | Lee | 331/1 A |
| 4,506,233 | 3/1985 | Englund Jr. | 331/17 |
| 4,516,083 | 5/1985 | Turney | 331/1 A |
| 4,525,686 | 6/1985 | Yokoya | 331/17 |
| 4,555,679 | 11/1985 | Katsuyama | 331/17 |
| 4,633,488 | 12/1986 | shaw | 375/120 |
| 4,634,998 | 1/1987 | Crawford | 331/1 A |
| 4,691,175 | 9/1987 | Ecklund | 331/1 A |
| 4,771,250 | 9/1988 | Statman et al. | 328/155 |
| 4,881,240 | 11/1989 | Critchlow et al. | 375/15 |
| 4,910,465 | 3/1990 | Dillman | 328/145 |

OTHER PUBLICATIONS

Van Trees, Harry L., Detection, Estimation & Modulation Theory, Pt. I, pp. 538-541; Pt. II, pp. 37, 38, 40, 49. John Wiley & Sons, N.Y.

Primary Examiner—Benedict V. Safourek
Attorney, Agent, or Firm—Lowe, Price, LeBlanc & Becker

[57] ABSTRACT

A receiver responsive to a noise laden phase modulated signal on a carrier hard limits the signal to derive a constant amplitude phase modulated r.f. signal. The constant amplitude phase modulated r.f. signal is supplied to processing circuitry to derive a digital signal having a value representing the phase of the noise laden carrier. A phase locked loop, including a minimum variance Kalman predictor filter, responds to the noise laden carrier to derive a relatively noise free indication of carrier phase. The noise laden indication of phase and the relatively noise free indication of carrier phase are combined to indicate the phase of the phase modulated signal to which the receiver is responsive.

20 Claims, 3 Drawing Sheets

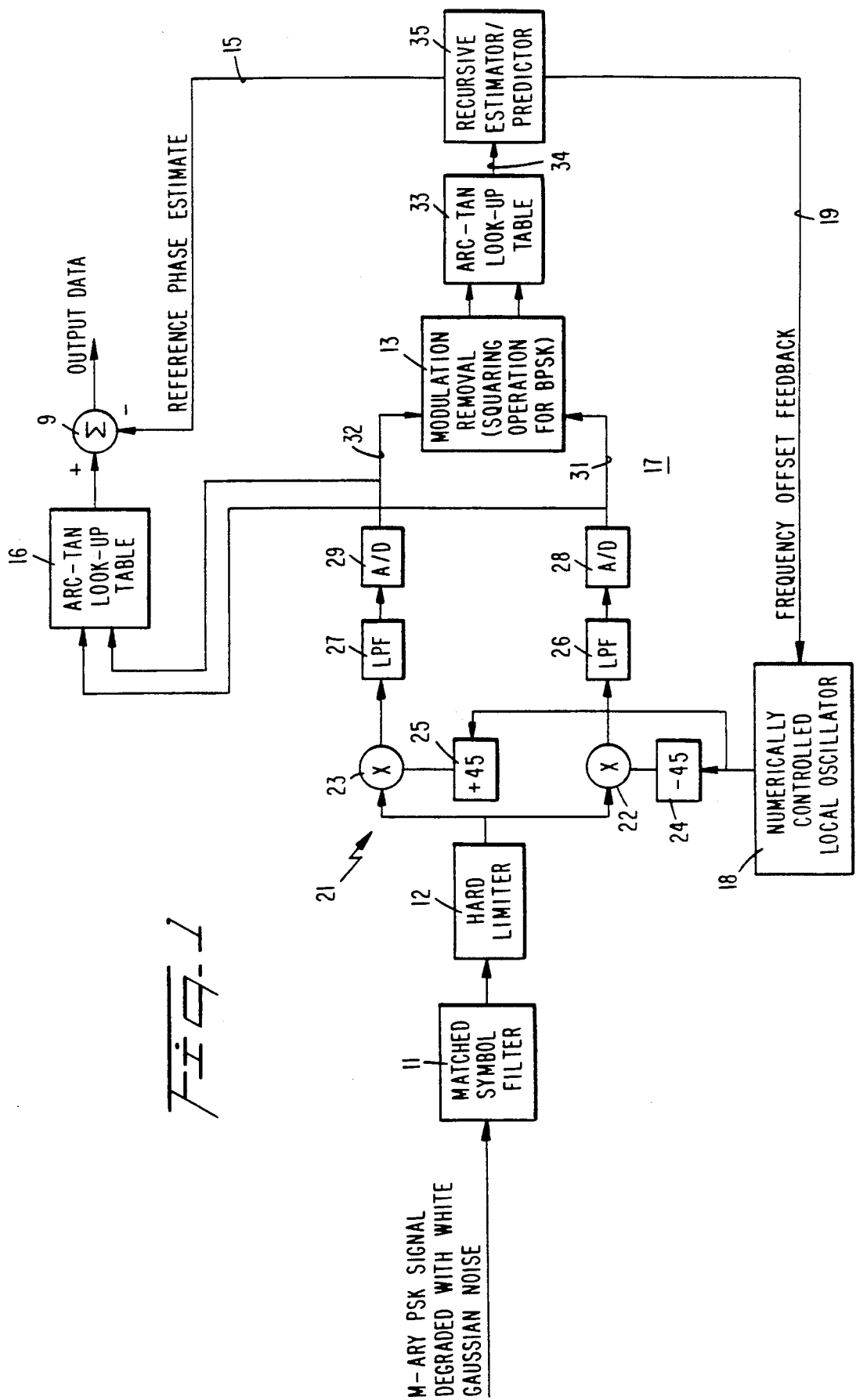

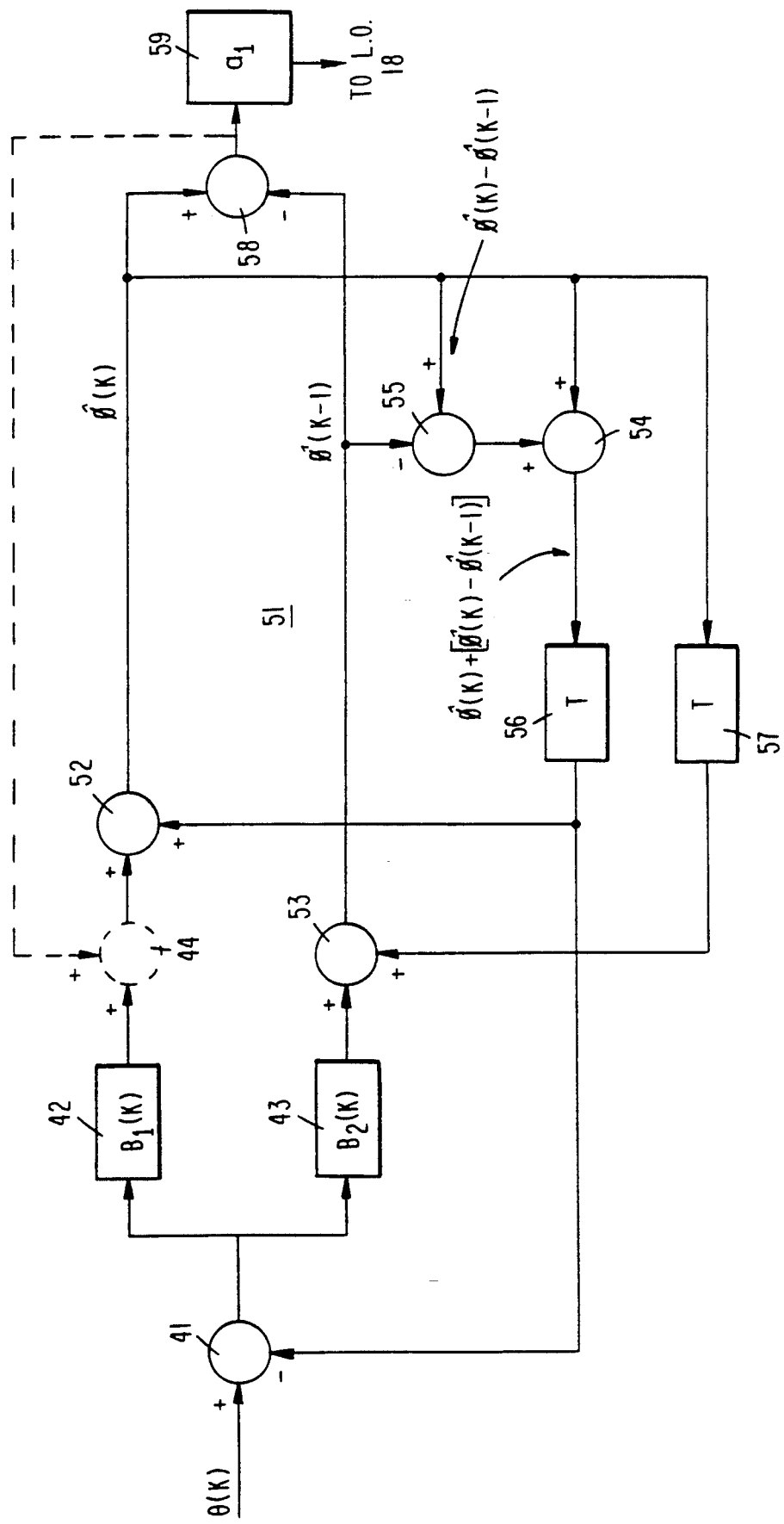

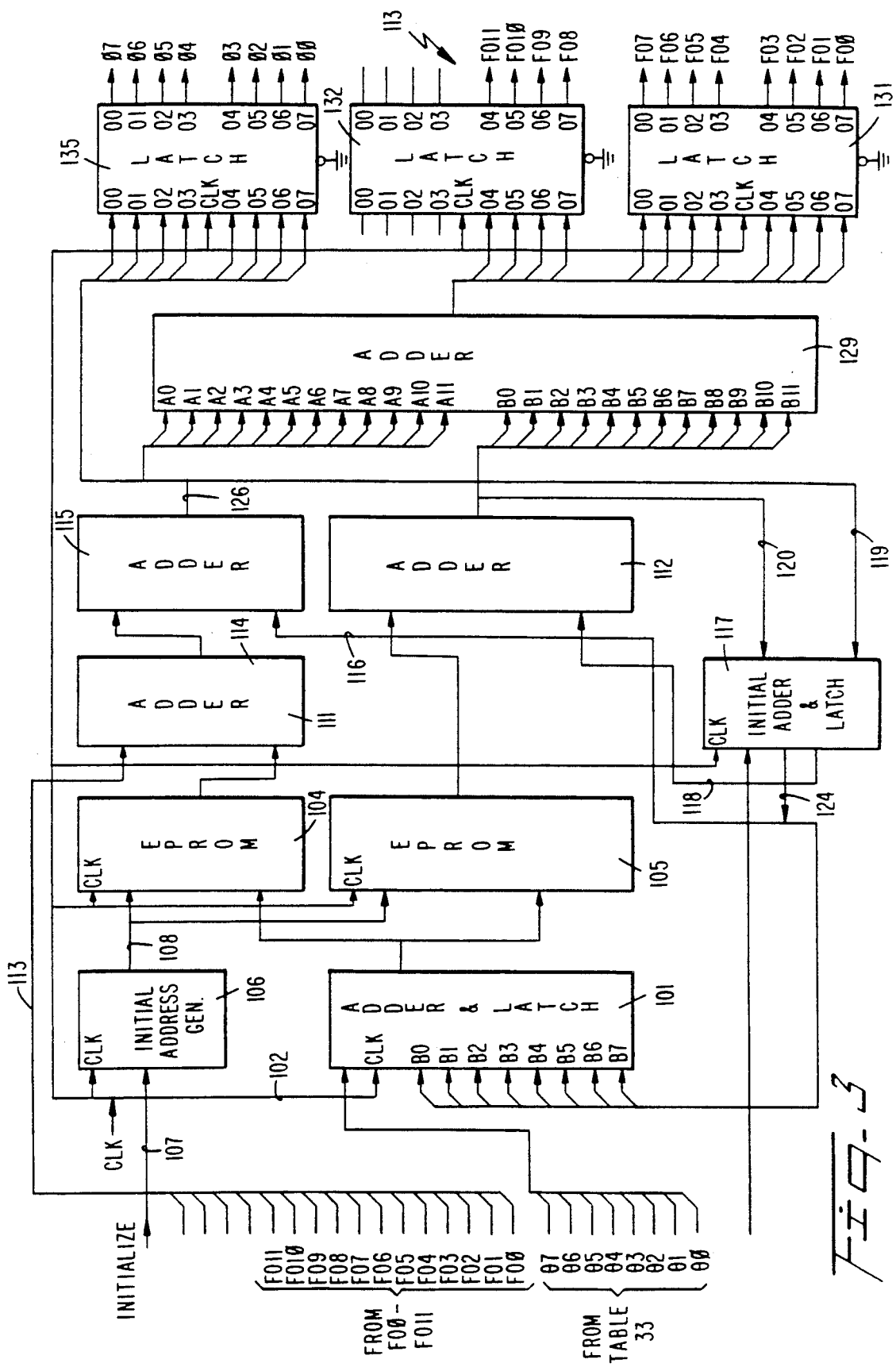

5,062,123

KALMAN PREDICTOR FOR PROVIDING A RELATIVELY NOISE FREE INDICATION OF THE PHASE OF A CARRIER LADEN WITH NOISE

FIELD OF THE INVENTION

The present invention relates generally to retrieving a noise laden carrier from a signal and more particularly to a method of and apparatus for utilizing Kalman predictor techniques for providing a relatively noise free indication of the phase of a carrier laden with noise.

Background Art

In many applications, particularly radio receiver applications, it is necessary to derive a relatively noise free indication of the phase of a carrier wave from a noise laden, received carrier wave. In the past, phase locked loops have frequently been empoyed for this purpose.

A typical prior art phase locked loop includes a phase detector responsive to a received input signal and a reference frequency derived from a local oscillator. The received input signal to the loop is derived from the received carrier, which in turn should be a replica of a transmitted reference phase. The local oscillator reference frequency should track the transmitted reference phase to enable phase shift key (PSK) data modulating the received carrier to be retrieved.

The phase detector derives an output signal indicative of a phase error between the input signal and the local oscillator reference frequency. The phase error indicating signal is supplied to a loop filter, usually having time invariant, i.e., static, or discrete time-varying characteristics. The loop filter derives an output signal that is fed to an input of the local oscillator, configured as a variable frequency signal controlled oscillator. The loop filter output signal controls the oscillator, causing the oscillator to derive an output that closely tracks the frequency and phase of the input signal. However, if the received signal has a low signal-to-noise ratio tracking may not occur. The loop bandwidth, whether fixed or having discrete, time-varying values, is selected based on performance requirements to accommodate trade-offs affecting detection of the loop input signal.

Three critical parameters of a phase locked loop dictate how loop characteristics are specified in a design. Maximum allowable frequency offset determines how much a loop input signal may deviate from the local oscillator reference frequency to enable the loop to reach a locked state. As the loop bandwidth increases, greater amounts of frequency offset can be tolerated. However, increasing the loop bandwidth adversely affects the capability of the loop to detect low signal-to-noise ratio signals. For example, in the presence of noise, cycle slips can occur between the received signal and the local oscillator reference frequency output signal. Such cycle slips can have a catastrophic effect while phase shift key data modulating the carrier are detected.

The occurrence rate of slips between the local oscillator reference frequency output and the input signal is related to the signal-to-noise ratio of the received signal. The slip rate is decreased by maximizing signal-to-noise ratio in the loop bandwidth, which implies minimizing loop bandwidth. Loop bandwidth should also be relatively narrow to adequately handle steady state jitter, which causes the local oscillator reference frequency to deviate from the transmitted reference after phase lock has been achieved.

These opposing constraints indicate that if loop bandwidth is excessively wide, detection efficiency is sacrificed or pull-in range is comprised. Hence, the probability of completely missing a signal transmission, particularly of a short burst signal, such as occurs in packet switching arrangements, is quite high. In a conventional phase locked loop situation, phase lock must be achieved before incoming data can be detected. Therefore, signal acquisition time depends on phase locked loop lock performance. For phase locked loops having wide fixed bandwidths, acquisition time can be relatively lengthy, again increasing the probability of completely missing a burst type signal transmission.

It is, accordingly, an object of the invention to provide a new and improved apparatus for and method of deriving an indication of the phase of a noise laden received carrier.

Another object of the invention is to provide a new and improved receiver responsive to PSK modulated signals subject to low signal-to-noise ratios wherein a reference phase of the signal carrier is quickly derived with a time variant filter.

It is an additional object of the present invention to provide a new and improved phase locked loop particularly adapted to recover a reference phase from a burst type transmission.

Another object of the invention is to provide a new and improved phase locked loop having a filter with time-varying Characteristics for deriving a reference phase from a short duration burst subject to relatively low signal-to-noise ratio.

A further object of the invention is to provide a new and improved phase locked loop for deriving a reference phase from a short duration burst without recovering the carrier frequency of the burst.

Disclosure of the Invention

In accordance with the present invention, a relatively noise free indication of the phase of a noise laden carrier wave is derived by using Kalman predictor techniques and structures. Kalman predictor techniques are discussed in the book entitled Digital and Kalman Filtering, written by S.M. Bozic, first published in 1979, by Halsted Press, a division of John Wiley and Sons, Inc., New York; see pages 92-120 in particular.

It is there indicated, on page 103, that an optimum recursive estimator (scalar Kalman filter) is characterized by a network having a present observation or data input $Y(k)$ which is compared in a difference network with an estimate of $Y(k)$, i.e., $\hat{Y}(k)$. The resulting difference signal, $Y(k) - \hat{Y}(k)$, is supplied to a time-varying gain element having a time-varying response $b(k)$. The output signal of the time-varying gain element is supplied as one input to an adder, having a second input which is proportional to the previous estimate of the value of $Y(k)$, to enable derivation of a present estimate $\hat{X}(k)$. The signal indicative of $\hat{X}(k)$ is supplied to a delay element having a unit delay time, T, to derive a signal $\hat{X}(k-1)$. The $\hat{X}(k-1)$ signal is multiplied by a constant a, indicative of a parameter of the system with which the device is to be used to derive a signal representing a $\cdot\hat{X}(k-1)$. The $a\cdot\hat{X}(k-1)$ signal is supplied to a second input of the adder. In addition, the $a\cdot\hat{X}(k-1)$ signal is modified by a measurement parameter, c, to derive a signal $ac\cdot\hat{X}(k-1)$ which is equal to $\hat{Y}(k)$ and supplied to the input of the difference network to derive the Y(k-

)−$\hat{Y}(k)$ signal that is supplied to the time-varying gain element. The device is used to provide an estimate of the current value of a random signal in the presence of additive noise.

On pages 115-119 of the Bozic book there is a discussion of how the scalar Kalman filter algorithm is transformed into a corresponding vector Kalman filter. In the vector Kalman filter, the time-varying gain b(k) is written as $K_b$, and is referred to as a Kalman gain matrix. The system parameter coefficient, a, is transformed into a state transition matrix, A, while coefficient, c, is transformed into state feedback matrix, C. The difference output is referred to as a prediction error, while the output of the time-varying gain element is referred to as an adjustment factor. The output signal of the adder is referred to as a state estimate, while the $a\cdot \hat{X}(k-1)$ output of the system parameter coefficient element is referred to as a propagated state.

The present invention relies on principles derived from the vector Kalman filter to determine an estimate of the phase of a noise laden carrier to provide a substantially noise free i ication of the phase of the carrier, represented as $X_1$, and an estimate of the change of the phase between successive samples of the carrier, referred to as a delta phase estimate, represented as $\hat{X}_1 - \hat{X}_2$. The state transition matrix, A, is defined for the situation of the present invention as:

$$A = \begin{bmatrix} 2 & -1 \\ 1 & 0 \end{bmatrix} \tag{1}$$

The appropriate measurement parameter, i.e., propagated output matrix, is represented as:

$$C = [1 \ 0]^T \tag{2}$$

For the situation in which a phase estimate is derived from a noise laden carrier signal, the Kalman equations, representing linear transitions and a timevarying function, are given as:

$$P(K|k-1) = AW(k-1|k-1)A^T \tag{3}$$

where:

$$W(k-1|k-1) = P(k-1|k-1) + Q_O \tag{4}$$

$A^T$ indicates that the coefficients of the A, state transition matrix are to be transposed diagonally, $P(k-1|k-1)$ = unpropagated covariance matrix, $Q_O$ = state transition noise, and the notations $(k|k-1)$ and $(k-1|k-1)$ are respecti the predicted covariance matrix and the error covariance matrix, so that, e.g., $P(k|k-1)$ is the covariance update of the sample of the carrier phase at time k to relative to the sample at time $k-1$. A covariance update is determined as:

$$P(k|k) = P(k|k-1) - K_b(K)CP(k|k-1) \tag{5}$$

The state propagation can be written as:

$$\hat{X}(k|k-1) = A\hat{X}(k-1|k-1) \tag{6}$$

From the foregoing, the Kalman gain update can be written as:

$$K_b(k) = P(k|k-1)C^T[CP(k|i-1)C^T + R_o]^{-1} \tag{7}$$

where $C^T$ indicates that the C matrix is to be transposed from a horizontal to a vertical matrix.

Iterative steps in the estimation process for the phase of the noise laden carrier are:

1. Calculate the propagated covariance matrix as:

$$W(k|k-1) = P(k-1|k-1) + Q_0 = \begin{bmatrix} w_{11} & w_{12} \\ w_{21} & w_{22} \end{bmatrix}, \tag{8}$$

$$P(k|k-1) = \begin{bmatrix} 4w_{11} - 2w_{12} - 2w_{21} + w_{22} & 2w_{11} - w_{21} \\ 2w_{11} - w_{12} & w_{11} \end{bmatrix}, \tag{9}$$

$$= \begin{bmatrix} p_{11} & p_{12} \\ p_{21} & p_{22} \end{bmatrix} \tag{10}$$

The expression of Equation (10) is the updated covariance matrix of the Kalman filter.

The second step of the iterative process is to compute the Kalman gain as:

$$K_b = \begin{bmatrix} p_{11} \\ p_{12} \end{bmatrix} \frac{1}{p_{11} + \partial_v^2}, \tag{11}$$

where $\partial^2_v$ = the variance of the noise laden carrier. Typically, the variance of the noise laden carrier is determined from the expected characteristics of the noise properties of the received signals. The matrix $$\begin{bmatrix} p_{11} \\ p_{12} \end{bmatrix} \tag{12}$$

implies a $2 \times 1$ Kalman matrix. The $$\begin{bmatrix} P_{11} \\ P_{11} \end{bmatrix}$$

matrix is achieved electronically by supplying a prediction error derived by a difference network responsive to an indication of the noise laden carrier phase and a predicted value thereof to a pair of circuits having different exponentially decreasing time-varying response characteristics. The two exponentially decreasing functions, $b_1(k)$ and $b_2(k)$, both have initial values of one. As time progresses, $b_1(k)$ and $b_2(k)$ approach different asymptotes with different slopes. From Equation (11) $b_1(k)$ and $b_2(k)$ are written as:

$$b_1(k) = \frac{p_{11}}{p_{11} + \partial_v^2}, \tag{13}$$

and $$b_2(k) = \frac{p_{12}}{p_{11} + \partial_v^2}. \tag{14}$$

The Kalman gains, i.e., time-varying transfer functions $b_1(k)$ and $b_2(k)$, are independent of the actual sample values for the case of a linear transition matrix, enabling a set of gains to be precomputed for a given scenario.

From the output signals of the two time-varying circuits having different transfer functions, the propagated state is computed. From the propagated state value the predicted estimate of the phase, which is compared with the noise laden phase, is derived. A new estimate of the carrier phase is then derived from an adder responsive to an output of the $b_1(k)$ Kalman gain element and the predicted estimate of the phase of the input.

Utilizing the above principles, in accordance with a further aspect of the invention, a relatively noise free indication of the phase of a carrier subject to substantial noise is obtained by deriving an indication of the instantaneous phase of the carrier. An indication of an estimate of the instantaneous phase of the carrier is derived by responding to a previous indication of a function of the relatively noise free carrier. An indication of the error between the indication of the instantaneous phase and the indication of the estimate of the instantaneous phase of the carrier is derived. The error indication is modified by a time-varying factor that preferably decreases in amplitude as a function of time. The modified error is combined with a prior indication of the relatively noise free indication of the carrier phase to derive the relatively noise free carrier indication.

In accordance with another aspect of the invention, a relatively noise free indication of the phase of a carrier subject to substantial noise is obtained by deriving an indication of the instantaneous phase of the carrier and responding to a previous indication of a function of the relatively noise free indication of the carrier phase to derive an indication of an estimate of the instantaneous phase of the carrier. There is further derived an indication of the error between the indication of the instantaneous phase and the indication of the estimate of the instantaneous phase of the carrier. The error indication is modified by first and second different time-varying factors to derive first and second different time-varying modifie error indications. An indication of a prior estimate of the phase of the carrier is derived. The indication of the relatively noise free estimate of the phase of the carrier is combined with the prior estimate of the carrier phase. These combined signals are delayed to derive indications of first and second different delayed functions. The indication of the first delayed function is combined with the first time-varying modified error indication to derive the relatively noise free indication of the estimate of the carrier phase. The indication of the second delayed function is combined with the first time-varying modified error indication to derive the relatively noise free indication of the estimate of the carrier phase. The indication of the second delayed function is combined with the second time-varying modified error indication to derive the indication of the prior estimate of the carrier phase.

Preferably, the function of the relatively noise free indication of the estimate of the carrier phase is the first delayed function. In such a situation, the first and second delayed functions may be respectively written as:

$$\hat{\phi}(k)+[\hat{\phi}(k)-\hat{\phi}(k-1)] \quad (15)$$

and $$\hat{\phi}(k) \quad (16)$$

where $\hat{\phi}(k)$ is the relatively noise free indication of the estimage of the phase, and $\hat{\phi}(k-1)$ is the indication of the prior estimate of the phase.

The technique may be employed in a phase locked loop responsive to a carrier laden with noise for deriving a substantially noise free indication of the carrier phase. Such a phase locked loop includes a signal controlled local oscillator for deriving an output signal. Circuit means responsive to the carrier and the local oscillator derives a signal having a value indicative of an error function between the phase of the local oscillator and the instantaneous phase of the carrier. A minimum variance Kalman predictor filter derives the substantially noise free indication of the carrier phase, as well as a control signal for the oscillator frequency. The control signal is applied to the oscillator to control the frequency thereof.

The invention may also be used in a receiver responsive to a phase modulated signal, particularly an M-ARY phase shift key (PSK) signal subject to being degraded with noise, such as in a packet switching transmission burst. In such a receiver, the signal is hard limited to derive a constant amplitude phase modulated r.f. signal. The constant amplitude phase modulated r.f. is supplied to a network, such as a squaring network, for deriving a carrier signal subject to a high noise content. A relatively noise free indication of the carrier phase is derived with a structure including a minimum variance Kalman predictor filter, preferably incorporated in a phase locked loop. In response to the constant amplitude phase modulated r.f. signal and the relatively noise free indication of the carrier phase, the phase of the modulated signal to which the receiver is responsive is derived. The resulting phase indication of the modulated signal to which the receiver is responsive is used to derive an indication of data modulating the signal supplied to the receiver.

A further object of the invention is to provide a new and improved receiver for deriving data from a phase modulated signal.

The above and still further objects, features and advantages of the present invention will become apparent upon consideration of the following detailed description of a specific embodiment thereof, especially when taken in conjunction with the accompanying drawings.

BRIEF DESCRIPTION OF DERAWINGS

FIG. 1 is a block diagram of a receiver including a phase locked loop in accordance with the present invention;

FIG. 2 is a simplified block diagram of a preferred embodiment of a Kalman predictor network in accordance with the present invention; and FIG. 3 is a more detailed block diagram of the Kalman predictor network.

DESCRIPTION OF THE PREFERRED EMBOIMDNET

Reference is now made to FIG. 1 of the drawing wherein there are illustrated the basic components of a receiver in accordance with the preferred embodiment of the present invention. The receiver of FIG. 1 is responsive to a packet switching transmission burst having a carrier modulated by an M-ary phase shift key (PSK) signal. The receiver input signal is degraded with noise, typically white Gaussian noise.

The signal supplied to the receiver is coupled to a matched symbol filter which strips a significant amount of noise from the signal. The output of matched symbol filter 11 is supplied to hard limiter 12. The output of hard limiter 12 is supplied to phase locked loop 17 which derives a binary, multi-bit parallel digital signal on bus 15, representing a relatively noise free estimate value of the phase of the carrier. The signal on bus 15 is referred to herein as a reference phase estimate.

The reference phase estimate signal on bus 15 is compared with the phase of the PSK data, derived internally of phase locked loop 17, to derive indications of the data modulating the carrier received by the receiver. Arc-tangent table 16 responds to the input signals supplied to it to derive a multi-bit, parallel, digital signal derived internally of phase locked loop 17. The arc-tangent signal derived by look-up table 16 represents the phase displacement between the reference phase estimate on bus 15 and the phase derived internally of phase locked loop 17, which in turn represents the phase of the M-ary PSK signal supplied to the receiver of FIG. 1. Basically, arc-tangent look-up table 16 determines the phase of the PSK signal which has substantial noise superimposed thereon, relative to the reference phase estimate on bus 15. Digital summing network 9 linearly combines the digital values indicative of phase as derived by table 16 and on bus 15 to derive a signal indicating the phase of the M-ary PSK input signal to filter 11. Network 9 combines the signal on bus 15 and the output of table 16 so that the network effectively functions as a subtraction network, whereby the output of the network represents the instantaneous, noise laden indication of the phase of the M-ary signal minus the reference phase estimate on bus 15. Both inputs to summing junction 9 vary in discrete steps, with the reference phase estimate on bus 15 varying in a relatively fixed manner, while the output of Arc-tangent look-up table 16 varies as a function of the data of the M-ary PSK signal and the noise superimposed thereon. Typically, there are several digital samples supplied to summing junction 9 by look-up table 16 and bus 15 during each cycle of the carrier sinusoid.

The receiver of FIG. 1 is typically responsive to relatively short duration bursts of a carrier signal that has been PSK modulated with data. The bursts typically include approximately 1000 bauds, such as exists in packet switching transmissions. The phase displacement representing output signal of summing network 9 is supplied to a conventional circuit that recovers the value of each baud.

Loop 17 includes numerically controlled, variable frequency local oscillator 18 responsive to a multi-bit digital control signal on bus 19. The signal on bus 19 controls the frequency of local oscillator 18 and is indicative of the offset to be applied to the local oscillator to cause the local oscillator output frequency to deviate from the normal, resonant frequency thereof to track the carrier frequency. Thereby, the magnitude of the digital signal on bus 19 is frequently referred to as a frequency offset feedback signal.

The variable frequency output of numerically controlled local oscillator 18 and the carrier frequency derived from the hard limiter 12, which is subject to a relatively high noise content, i.e., the output of the hard limiter 12 has a low signal-to-noise ratio, are combined in hybrid splitter 21. Hybrid splitter 21 includes mixers 22 and 23, driven in parallel by the output of hard limiter 12 and by outputs of local oscillator 18 which are shifted in phase 90° relative to each other. To provide the 90° relative phase shift, the output of local oscillator 18 is applied in parallel to +45° phase shifter 23 and 45° phase shifter 25; the outputs of phase shifters 24 and 25 are respectively applied to mixers 22 and 23. mixers 22 and 23 derive beat frequency output signals representing the in-phase and quadrature-phase (I and Q, respectively) components of the output of hard limiter 12. In addition, mixers 22 and 23 derive other components related to the frequencies of the signals derived by limiter 12 and local oscillator 18. The low, i.e., beat, frequency components derived by mixers 22 and 23 are passed to the exclusion of the other components by low pass filters 26 and 27 respectively.

The resulting I and Q components derived from low pass filters 26 and 27 are respectively applied to analog-to-digital converters 28 and 29, driven by the receiver clock source. Converters 28 and 29 respectively supply multi-bit binary signals on buses 31 and 32 respectively represent the amplitudes of the I and Q components of the noisy PSK signal at the output of limiter 12. Arc-tangent look-up table 16 is responsive to the multi-bit data on buses 31 and 32 to derive a multi-bit representation of the noisy PSK signal supplied to phased lock loop 17 from limiter 12. The signals on buses 31 and 32 are also applied to inputs of modulation removal circuit 13 which supplies multi-bit representations of the I and Q components of the noisy carrier phase to look-up table 33.

The signal on bus 34 is supplied to recursive estimator/predictor network 35, described in detail in connection with FIGS. 2 and 3. Network 35 is a minimum variance Kalman predictor filter which converts the noise laden digital signal on bus 34, representative of the instantaneous phase of the output of limiter 12, into the multi-bit signal on bus 15 that has a magnitude indicative of the phase of the carrier supplied to this system, with a substantial amount of the noise removed. In addition, network 35 supplies bus 19 with a signal indicative of the frequency offset control signal for local oscillator 17. As indicated sucra, the signals on buses 15 and 19 are respectively applied to summing junction 9 and numerically controlled local oscillator 18.

A simplified block diagram of recursive estimator/predictor network 35, which is a minimum variance counter predictor filter, is illustrated in FIG. 2. In FIG. 2, conventional Kalman predictor filter notation is employed such that each sample at a sampling time k is represented with the functional notation f(k), while the sample at the previous sampling time is represented by the functional notation f(k−1). In the simplified block diagram of FIG. 2, all signals are represented as a single line; in actuality, every signal in the circuit of FIG. 2 is a digital signal on a multi-bit bus. Also, all of the components illustrated in FIG. 2 are, in actuality, digital processing components, even though they are broadly illustrated in the same manner as analog components.

Network 35, as illustrated in FIG. 2, includes comparator, i.e., difference network, 41, having one input responsive to the noise laden indication of the instantaneous phase of hard limiter 12, as derived from look-up table 33 and represented by $\theta(k)$. Difference network 41 is also responsive to a predicted value, $\hat{\theta}(k)$, of $\theta(k)$ as derived by the circuitry of FIG. 2. Network 41 responds to the input signals thereof to derive an error signal having a magnitude representing $\theta(k)-\hat{\theta}(k)$.

The $\theta(k)-\hat{\theta}(k)$ output signal of difference network 41 is applied in parallel to networks 42 and 43, respectively having transfer functions $B_1(k)$ and $B_2(k)$ Functions $B_1(k)$ and $B_2(k)$ are two different timevarying functions having initial values of one. The values of $B_1(k)$ and $B_2(k)$ decrease exponentially at different rates to finite, non-zero different values. Typically, the values of $B_1(k)$ and $B_2(k)$ decrease over $2^{10}=1028$ sample cycles of $\theta(k)-\hat{\theta}(k)$, i.e., 1028 sample cycles of converters 28 and 29. The values of $B_1(k)$ and $B_2(k)$ are determined by the expected variance, i.e., standard deviation squared, and expected state values of the noise characteristics of the signal expected to be received by the receiver of FIG. 1. The functional values $B_1(k)$ and $B_2(k)$ are preprogrammed into networks 42 and 43 in accordance with the minimum variance Kalman predictor filter theory described supra.

For the phase locked loop application of FIG. 1, the output signal of network 42 is combined with a signal indicative of the frequency offset control for oscillator 18 on bus 19. The frequency offset signal is added in adder 44 to the output of network 42. If the circuit of FIG. 2 is used to derive a signal that recovers the phase of $\theta(k)$ in a system that does not require the derivation of the offset correction factor on bus 19, adder 44 is omitted. Because of this relationship, adder 44 and the circuitry associated therewith are shown in dotted lines in FIG. 2.

To derive signals representing the current estimate of the phase of the carrier and of the previous sample of the carrier phase, feedback network 51 including summers 52, 53 and 54 and difference network 55, as well as one sample cycle delay elements 56 and 57, is provided. Delay elements 56 and 57 introduce a delay time that is equal to the time between adjacent samples taken by analog-to-digital converters 28 and 29.

Adder 52 responds to the output si of adder 44 and delay network 56 to derive signa $\hat{\phi}(k)$. Signal $\hat{\phi}(k)$, having a value representing a predicted value of the phase of the relatively noisy output of hard limiter 12, is supplied to bus 15 to enable information to be derived from the output of matched filter 11.

Adder 53 is responsive to the output of delay network 57 and the output of network 43. Adder 53 adds the signals supplied to it to derive output signal $\hat{\phi}(k-1)$, having a value representing the phase of the reference phase estimate during the previous sample taken by converters 28 and 29. The signal supplied to adder 53 by adder 57 is derived by supplying the $\hat{\phi}(k)$ output of adder 52 directly to the input of delay network 57. The input to adder 52 from delay network 56, however, is delayed one sample time of converters 28 and 29 from the outputs of adders 54 and 55 as represented by:

$$\hat{\phi}(k) - [\hat{\phi}(k) - \hat{\phi}(k-1)].$$

In other words, the output of delay network 56 is one sample time displaced from the reference phase estimate $\hat{\phi}(k)$ plus the error between the current and previous sample reference phase estimates $\hat{\phi}(k)$ and $\hat{\phi}(k-1)$ derived from summing networks 52 and 53. To derive the input of delay network 56, the $\hat{\phi}(k)$ and $\hat{\phi}(k-1)$ outputs of summing networks 52 and 53 are respectively applied to minuend (+) and subtrahend (−) inputs of difference network 55, which thereby derives an output signal representing $\hat{\phi}(k) - \hat{\phi}(k-1)$. The output signal of network 55 is combined with the output signal of network 52 in summing network 54 which derives the $\hat{\phi}(k) + [\hat{\phi}(k) - \hat{\phi}(k-1)]$ signal that is applied to delay To derive the signal on bus 19, the output signals of summing networks 52 and 53 are respectively supplied to minuend (+) and subtrahend (−) inputs of differance network 58, which derives a difference output $\hat{\phi}(k) - k - 1)$ that is supplied in parallel to adder 44 and multiplier network 59. Multiplier network 59 multiplies the input signal thereof by a constant, coefficient value, $a_1$, having a value less than 1 to ensure stability of local oscillator 18. The output of network 59 is applied as a control input to oscillator 18 via bus 19.

Reference is now made to FIG. 3 of the drawing, a more detailed block diagram of the apparatus generally illustrated in FIG. 2. The apparatus illustrated in FIG. 3 generally employs eight bit buses and is responsive to the receiver clock source that drives converters 28 and 29, as well as an initialize source, derived by the receiver in a conventional manner. The initializing voltage is derived when the receiver begins to acquire the phase estimate on bus 15, as occurs during a start-up period of the receiver or when the receiver begins to respond to a signal having a low signal-to-noise ratio after being responsive to a signal having a high signal-to-noise ratio.

The apparatus illustrated in FIG. 3 includes adder-latch network 101, configured as a subtractor having inputs responsive to the output of arc-tangent network 31 representing the instantaneous phase of the output of squaring network 13, $\theta(k)$, and the predicted estimate $\hat{\theta}(k)$. Adder-latch network 101 includes a clock input terminal responsive to the clock signal applied to the network of FIG. 3 on lead 102. Each time a pulse is supplied to the clock input of adderlatch network 101, the network responds to the signal supplied to it to derive a binary output signal on bus 103 representing $\theta(k) - \hat{\theta}(k)$. A constant $\theta(k) - \hat{\theta}(k)$ output signal is supplied to bus 103 by adder-latch network 101 until the next clock pulse is supplied to lead 102.

The output signal of adder-latch network 101 on bus 103 is applied in parallel to first address inputs of memories 104 and 105, having second address inputs responsive to the 8-bit output of address generator 106. Memories 104 and 105, in the preferred embodiment electronic programmable read only memories (EPROMs) respond to the input signals thereof to provide the $B_1(k)$ and $B_2(k)$ transfer functions. To these ends, EPROMs 104 and 105 store the functions $B_1(k)$ and $B_2(k)$ and derive these functions in response to time indicating output bytes of address generator 106. The resulting time-varying $B_1(k)$ and $B_2(k)$ functions derived in EPROMs 104 and 105 are multiplied in the EPROMs by the signal supplied to the EPROMs representing $\theta(k) - \hat{\theta}(k)$, as derived from address-latch network 101.

To derive the address inputs of EPROMs 104 and 105, address generator 106 comprises a counter that is incremented by a count of one each time a clock pulse is derived on lead 102, by virtue of a clock input of the address generator being connected to lead 102. Address generator 106 is initially set to a count of zero, by virtue of a reset input thereof being connected to lead 107 on which the initializing pulse is developed. The counter of address generator 106 responds to the clock signal on lead 102 to derive successively increasing digital values on bus 108. When the maximum count of the counter in address generator 106 is reached, the signal supplied by the address generator to bus 108 remains constant at the maximum value until a pulse is applied to the reset input of the counter. Typically, the maximum count of address generator 106 is $2^{10} = 1028$. Since approximately sixteen samples are taken during each cycle of the signal at the output of squarer 13, about 64 cycles of the squarer output are sampled prior to the address generator maximum count of 1028 being reached. Because the receiver is responsive to burst type signals, the maximum count of address generator 106 is frequently not reached while the burst is being received.

EPROMs 104 and 105 include a clock (CLK) input terminal responsive to the clock signal on lead 102. Each time a clock pulse is derived on lead 102, EPROMs 104 and 105 respond to the signal supplied thereto by address generator 106 and address-latch network 101 to derive the output signals thereof. The output signals of EPROMs 104 and 105 remain constant during the entire clock cycle associated with each clock pulse on lead 102. In response to the initial, zero indicating output of address generator 106, EPROMs 104 and 105 are programmed to derive binary 1 values, so that the signal supplied to the EPROMs by the output of addresslatch network 101 is not modified by the EPROMs. As time progresses the address signal supplied by address generator 106 to EPROMs 104 and 105 causes the EPROMs to derive successively lower values which reach asymptotic, non-zero values when the maximum count of address generator 106 is derived. The final values derived by EPROMs 104 and 105 in response to the output signal of address generator 106 differ, as do the slopes of the signals derived by the EPROMs in response to intermediate values of the output of address generator 106. The resulting time-varying functions derived by EPROMs 104 and 105 in response to the output of address generator and bus 108 are multiplied by the output of address-latch network 101. The circuitry included in EPROMs 104 and 105 basically functions on a real-time basis so that for each clock cycle of the signal on lead 102, the outputs of EPROM 104 and 105 are respectively $B_1(k)[\theta(k) - \hat{\theta}(k)]$ and $B_2(k)[\theta(k) - \hat{\theta}(k)]$. The signal stored in EPROMs 104 and 105 representing $B_1(k)$ and $B_2(k)$ are determined by the expected signal-to-noise ratio of the signal supplied to phase locked loop 17 and the inaccuracy of the state matrix of the Kalman filter, as described supra.

The output signals of EPROMs 104 and 105 are respectively applied to adders 111 and 112. Adder 111 is also responsive to a signal indicative of the error between the current indication of phase of the carrier and the previous indication of the phase of the carrier, represented by $[\theta(k) - \theta(k-1)]$, as derived on 16-bit bus 113. Bus 113 has 16 bits to enable the four least significant bits of the difference indicating signal $[\theta(k) - \theta(k-1)]$ to be represented. The four most significant bits of bus 113 always have a value of zero, while the four least significant bits are derived, as described infra, by algebraic combinations of the various signals. Adder 111 derives a 12-bit output on bus 114 representing $[\phi(k) - \phi(k-1)] + [\theta(k) - \theta(k-1)][B_1(k)]$.

The output of adder 111, on bus 114, is supplied to one input bus of adder 115, having a second input bus 116 to which is supplied a signal representing $\phi(k) + [\phi(k) - \phi(k-1)]$. The signal on bus 116 is derived from one output of adder-latch network 117, having a second output on bus 118. Adder-latch network 117 includes two 8-bit input buses 119 and 120, respectively responsive to signals representing $\phi(k)$ and $\phi(k-1)$. Adder-latch network 117 also includes a reset input responsive to the signal on lead 122. The signal on lead 122 is derived in response to (1) the initialize signal being on lead 107, or (2) the receiver being activated to detect the phase of the signal derived by phase locked loop 17 or (3) clock synchronization between the receiver of FIG. 1 and the received signal of the receiver being achieved, or (4) the receiver sensing that a signal has been supplied to it; the receiver senses each of (1)-(4) with known circuitry (not shown) in a known manner. In response to a pulse being supplied to the reset input of adder-latch network 117, the states of all of the latched outputs of address-latch network 117 are reset to the zero state. Adder-latch network 117 also includes a clock input responsive to the clock signal on lead 102.

Adder-latch network 117 includes internal addition and subtraction matrices to derive on buses 118 and 124 signals respectively representing $\phi(k) + [\phi(k) - \phi(k-1)]$ and $\phi(k)$. The signals on buses 118 and 124 are both time delayed one cycle time of the clock signal on lead 102 so that the signals on buses 118 and 124 during cycle time $t_n$ represent the values of $\phi(k) + [\phi(k) - \phi(k-1)]$ and $\phi(k)$ as derived on buses 118 and 124 during cycle time $t_{n-1}$. Because of this delay characteristic of adder-latch network 117., network 117 is sometimes referred to as a state propagation network.

The signal on bus 124 representing $\hat{\theta}(k) = \theta(k) + [\theta(k) - \theta(k-1)]$ is supplied to one input of addresslatch network 101, where it is combined with the noise laden indication of the phase of the output of squaring network 113 to derive error signal $\theta(k) - \hat{\theta}(k)$. In addition, the signal on bus 124 is supplied to adder network 115, also responsive to the output of adder network 111 to derive a 12-bit signal on bus 126 indicative of $\phi(k)$.

The output signal on bus 118 of adder-latch network 117 is supplied to one input of adder-network 112, having a second input responsive to the output signal of EPROM 105. Adder 112 responds to the output of (PROM 105 and the signal on bus 118 to derive a 12bit output signal representing $\phi(k-1)$.

The two 12-bit output signals of adders 112 and 115, respectively representing $\phi(k-1)$ and $\phi(k)$ are supplied to adder 129, configured as a difference network, to derive a 12-bit output signal representing $\phi(k) - \phi(k-1)$. The 12-bit output signal of network 129 represents the change in phase of the noise laden carrier signal derived from phase locked loop 17 during one cycle time of the clock pulses on lead 102. The $\phi(k) - \phi(k-1)$ output signal of adder 129 also provides an indication of the frequency offset correction factor supplied by bus 19 to local oscillator 18, FIG. 1.

The output signal of network 129 is supplied to 1 atch circuits 131 and 132. The eight least significant bits of the output of network 129 are supplied to latch network 131. The four most significant bits of the output of network 129 are supplied to four inputs of latch network 132, the remaining inputs of which are grounded. Latch networks 131 and 132 include clock input terminals responsive to the clock signal on lead 102. During each cycle time of the clock signal on lead 102, i.e., between adjacent clock pulses, the outputs of latch networks 131 and 132 are maintained in a constant state. The 12 output leads of latch networks 131 and 132 form 12-bit bus 113. The 12-bit signal on bus 113 is supplied to multiplier matrix 133, which supplies a constant multiplication or coefficient factor to the signal on bus 113. The multiplication factor of matrix 133, determined by the desired stability and response time of phase locked loop 17, is less than one. The output of matrix 133 is supplied to bus 19 to provide the control input for local oscillator 118.

The relatively noise free estimate or indication of the phase of the noise laden carrier derived by phase locked loop 17 that is supplied to arc-tangent network 16 is derived by supplying the eight most significant bits of the output of adder 115 on bus 126 to latch network 135, having a clock input terminal responsive to the clock signal on lead 102. The 8-bit output of latch network 135 is thereby stabilized during each clock cycle of the clock signal on lead 102. In addition, latch network 135 is arranged so that the output signals thereof are in synchronism with the output signal of analog-to-digital converter 16, which supplies the other input signal to arc-tangent network 117.

While there has been described and illustrated one specific embodiment of the invention, it will be clear that variations in the details of the embodiment specifically illustrated and described may be made without departing from the true spirit and scope of the invention as defined in the appended claims.

We claim:

1. A method of deriving a relatively noise free indication of an estimate of the phase of a noise laden signal replica compirsing the step of suplying an indication of the phase of the noise laden signal replica to a Kalman filter that derives the relatively noise free indication of the signal replica phase.

2. A method of deriving a relatively noise free indication of an estimate of the phase of a nois laden signal replica compirsing deriving an indication of the instantaneous phase of the noise laden signal replica, responding to a previous indication of a function of the relatively noise free indication of the signal replica phase to derive an indication of an estimate of the instantaneous phase of the signal replica, deriving an indication of the error between the indication of the instantaneous phase and the indication of the estimate of the instantaneous phase of the signal replica, modifying the error indication by a time-varying factor, and combining the modified error with a prior indication of the relatively noise free indication of the signal replica phase to derive the relatively noise free indication.

3. The method of claim 2 wherein the factor decreases in amplitude as a function of time.

4. The method of claim 2 wherien the factor is determined by the signal replica expected noise.

5. The method of claim 2 wherein the error indication is modified by first and second different time-varying factors to derive first and second different time-varying modified error indications, the combining step including: combining the first time-varying modified error indication with a function of the prior relatively noise free indication and of a previous indication of the second time-varying modified error indication.

6. A method of deriving a relatively noise free indication of the phase of a noise laden carrier comprising deriving an indication of the instantaneous phase of the noise laden carrier, responding to a previous indication of a function of the relatively noise free indication of the estimate of carrier phase to derive an indication of an estimate of the instantaneous phase of the carrier, deriving an indication of the error between the indication of the instantaneous phase and the indication of the estimate of the instantaneous phase of the carrier, modifying the error indication by first and, second different time-varying factors to derive first and second different time-varying modified error indications, deriving an indication of a prior estimate of the phase of the carrier, combining and delaying the indications of the relatively noise free estimate of the phase of the carrier and the prior estimate of the phase of the carrier to derive indications of first and second different delayed functions, combining the indication of the first delayed function with the fitst time-varying modified error indication to derive the relatively noise free indication of the estimate of the phase of the carrier, and combining the indication of the second delayed function with the second time-varying modified error indication to derive the indication of the prior estimate of the phase of the carrier.

7. The method of claim 6 wherein the function of the relatively noise free indication of the estimate of the carrier phase is said first delayed function.

8. The method of claim 7 wherein the first and second delayed functions are respectively:

$$\hat{\theta}(k)+[\hat{\theta}(k)-\hat{\theta}(k-1)] \text{ and } \hat{\theta}(k),$$

where $\hat{\theta}(k)$ is the relatively noise free indication of the estimate of the phase, and $\phi(k-1)$ is the indication of the prior estimate of the phase.

9. The method of claim 6 wherein the first and second delayed functions are respectively:

$$\hat{\theta}(k)+[\hat{\theta}(k)-\hat{\theta}(k-1)] \text{ and } \hat{\theta}(k),$$

where $\hat{\theta}(k)$ is the relatively noise free indication of the estimate of the phase, and $\phi(k-1)$ is the indication of the prior estimate of the phase.

10. A phase locked loop responsive to a carrier subject to noise for deriving a substantially nose free indication of the phase of the carrier comprising a signal controlled local oscillator for deriviong an output signal, means responsive to the carrier and the local oscillator for deriving a signal having a vlaue indicative of an error function between the phase of the first output siganl and the instantaneous phase of the carrier, and a Kalman filter responsive to the rror function indicating second output signal for deriving the substantially noise free indiction of the carrier phase and a control signal for the frequency of the oscillator, the control signal being applied to the oscillator to control the frequency thereof, the Kalman filter icnlduing measn for deriving an indication of the error between the instantaneous phase of teh carrier relative to a delayed function of the noise free indication of the phase of the carrier, time-varying gain mean for modigying the error indiction, means for combining an output signal of the time-varying gain means, an indication of teh value of the control signal for the frequency of the first output signal and a delayed function of the noise free indiction of the phase of the carrier, and measn responsive to (a) the time-varying gain measn, (b) an indication of the value of the control signal for the oscillator, and (c) first and second delyaed functions of the oise free indication of the phase of the carrier for deriving the substantially noise free indication of the phase of teh carrier and an indication of a prior value of the phase of the carrier, and means for combining the substantially noise free indication of the phase of the carrier and the indication of the prior value ofthe phase of carrier to derive the control signal for the frequency ofthe oscillator.

11. The phase locked loop of claim 10 wherein the time-varying gain means includes means for modifying the error indication by first and second different time-varying functions to derive first and second output signals having values respectively indicative of the error indication as modified by the first and second time-varying functions, the means for deriving substantially noise free indication of the phase .fo the carrier and an indication of a prior value of the phase of the carrier including means for combining the first output signal with a first delayed function of the noise free indication of the phase of the carrier and an indication of the value of the control signal to derive the noise free indication of the phase of the carrier and for combining the second output signal with a second delayed function of both the noise free indication of the phase of the carrier and a prior indication of the phases of the carrier to derive the indication of the prior value of the phase of the carrier.

12. A receiver respnsive to a replica of a phase modulated signal subject to being degraded with noise comprising means rsponsive to the signal for hard limiting the signal to derive a constant amplitude phase modulated r.f. signal, means responsive to the constant amplitude phase modulated r.f. signal for deriving a carrier subject to noise, means responsive to the carrier for deriving a relatively noise free indication of the phase of the carrier, siad last named means icnoduing a Kalman filter, adn means respnvie to the constant amplitude phase modulated r.f. signal and the relatively noise free indication of the phase of the carrier for indicating the phase of teh phase modulated signal to which the receiver is responsive, the Kalman predictor including means for deriving an indication of the error between the instantaneous phase of the carrier relative to a delayed function of the noise free indication of the phase of the carrier, time-varying gain means for modifyibng the error indication, means for combining an output signalof the time-varying gain means, and a delayed function of the noise free indication of the phase of the carrier, and means respnsive to (a) the time-varying gain means, and (b) first and second delayed functions of the noise free indication of the phase of the carrier for driving the substantially noise free indication of the phase of the carrier and an indication of a prior value of the phase of the carrier, and means for combining the substantially noise free indicaion of the phase of the carrier and the indication of the prior value ofthe phase of carrier to derive the control sigal for the frequency of the socillator.

13. The receiver of claim 12 wherein the timevarying gain means includes means for modifying the error indication by first and second different timevarying functions to derive first and second output signals having values respectively indicative of the error indication as modified by the first and second time-varying functions, the means for deriving substantially noise free indication of the phase of the carrier and an indication of a prior value of the phase of the carrier, including means for combining the first output signal with a first delayed function of the noise free indication of the phase of the carrier and an indication of the value of the control signal to derive the noise free indication of the phase of the carrier and for combining the second output signal with a second delayed function of both the noise free indication of the phase of the carrier and a prior indication of the phases of the carrier to derive the indication of the prior value of the phase of the carrier.

14. Apparatus for deriving a relatively noise free indication of an estimate of the phase of a replica of a signal having substantial noise compirisng means for deriving an idnication of the instantaneous phase of the signal replica, means respnsive to a previous indication of a function of the relatively noise free indicaton of the signal replica phase for deriving an idnication of an estimate of the instantaneous phase of the signal replica, means for deriving an indiction of the error between the indicaton of the instantaneous phase and the indication of the estimate of the instantaneous phase of the signal replica, means for modifying the error indicaton by a timevarying factor, and measn for combining the modifiwed error with a prior indication of the relatively noise free indication of the siganl replica phase to derive the relatively noise free indicaton.

15. The apparatus of claim 14 wherein the factor decreases in amplitude as a function of time.

16. The apparatus of claim 14 wherein the means for modifying includes means for modifying the error indication by first and second different time-varying factors to derive first and second different timevarying modified error indications, the means for combining including: means for combining the first time-varying modified error indication with a function of the prior relatively noise free indication and of a previous indication of the second time-varying modified error indication.

17. Apparatus for deriving a relatively noise free indication of the phase of a carrier subject to substantial noise comprising means for deriving an indication of the instantaneous phase of the carrier, means responsive to a previous indication of a function of the relatively noise free indication of the estimate of carrier phase to derive an indication of an estimate of the instantaneous phase of the carrier, means for deriving an indication of the error between the indication of the instantaneous phase and the indication of the estimate of the instantaneous phase of the carrier, means for modifying the error indication by first and second different time-varying factors to derive first and second different timevarying modified error indications, means for deriving an indication of a prior estimate of the phase of the carrier, means for combining and delaying the indications of the relatively noise free estimate of the phase of the carrier and the prior estimate of the phase of the carrier to derive indications of first and second different delayed functions, means for combining the indication of the first delayed function with the first time-varying modified error indication to derive the relatively noise free indication of the estimate of the phase of the carrier, and means for combining the indication of the second delayed function with the second time-varying modified error indication to derive the indication of the prior estimate of the phase of the carrier.

18. The apparatus of claim 17 wherein the function of the relatively noise free indication of the estimate of the carrier phase is said first delayed function.

19. The apparatus of claim 18 wherein the first and second delayed functions are respectively:

$$\hat{\theta}(k) + [\hat{\theta}(k) - \hat{\theta}(k-1)] \text{ and } \hat{\theta}(k),$$

where $\hat{\theta}(k)$ is the relatively noise free indication of the estimate of the phase, and $\phi(k-1)$ is the indication of the prior estimate of the phase.

20. The apparatus of claim 17 wherein the first and second delayed functions are respectively:

$$\hat{\theta}(k) + [\hat{\theta}(k) - \hat{\theta}(k-1)] \text{ and } \hat{\theta}(k),$$

where $\hat{\theta}(k)$ is the relatively noise free indication of the estimate of the phase, and $\phi(k-1)$ is the indication of the prior estimate of the phase.

* * * * *